(12) United States Patent
Chang

(10) Patent No.: US 8,357,466 B2
(45) Date of Patent: Jan. 22, 2013

(54) BATTERY COVER LATCHING ASSEMBLY

(75) Inventor: Cheng-Lung Chang, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 890 days.

(21) Appl. No.: 12/430,184

(22) Filed: Apr. 27, 2009

(65) Prior Publication Data
US 2009/0269662 A1 Oct. 29, 2009

(30) Foreign Application Priority Data
Apr. 28, 2008 (CN) .......................... 2008 1 0301331

(51) Int. Cl.
*H01M 2/08* (2006.01)
*H04B 1/08* (2006.01)
(52) U.S. Cl. .......... 429/175; 429/97; 429/163; 429/165; 455/347; 455/575.1

(58) Field of Classification Search ................ 429/163, 429/164, 165, 175, 97; 455/347, 575.1
See application file for complete search history.

(56) References Cited

U.S. PATENT DOCUMENTS

| 5,471,667 | A * | 11/1995 | Yamada | 455/351 |
| 7,512,397 | B2 * | 3/2009 | Liu et al. | 455/347 |
| 2006/0172183 | A1 * | 8/2006 | Chen et al. | 429/97 |
| 2007/0026297 | A1 * | 2/2007 | Qin et al. | 429/97 |
| 2007/0218961 | A1 * | 9/2007 | Luo et al. | 455/575.1 |
| 2008/0146169 | A1 * | 6/2008 | Kim et al. | 455/90.3 |
| 2009/0147485 | A1 * | 6/2009 | Higashigawa et al. | 361/727 |

* cited by examiner

*Primary Examiner* — Patrick Ryan
*Assistant Examiner* — Alex Usyatinsky
(74) *Attorney, Agent, or Firm* — Altis Law Group, Inc.

(57) ABSTRACT

A battery cover latching assembly includes a body member defining a guiding slot, a battery cover slidably mounted to the body member, and an elastic member. The battery cover includes a resisting block. The resisting block is slidably received in the guiding slot. The elastic member abuts against the resisting block.

10 Claims, 6 Drawing Sheets

BATTERY COVER LATCHING ASSEMBLY

BACKGROUND

1. Technical Field

The present disclosure relates to battery covers and, particularly, to a battery cover latching assembly used in a portable electronic device.

2. Description of Related Art

Batteries are used to provide power to portable electronic devices, e.g., mobile phones. Battery cover latching assemblies are usually provided to secure battery within portable electronic devices.

A typical battery cover latching assembly for an electronic device usually includes a battery cover and latching means, e.g., a locking pin latching into a locking hole. The battery cover can be detachably mounted to a housing of portable electronic devices using the latching means.

However, to replace batteries, it is required to first detach the battery cover from the housing, then insert a new battery into the housing and finally lock the battery cover to the housing again. Thus, it is inconvenient for users, and the battery cover may subject to risk of being lost or misplaced.

Therefore, there is room for improvement within the art.

BRIEF DESCRIPTION OF THE DRAWINGS

Many aspects of the battery cover latching assembly can be better understood with reference to the following drawings. These drawings are not necessarily drawn to scale, the emphasis instead being placed upon clearly illustrating the principles of the present battery cover latching assembly. Moreover, in the drawings like reference numerals designate corresponding sections throughout the several views.

DETAILED DESCRIPTION

Figure 1:
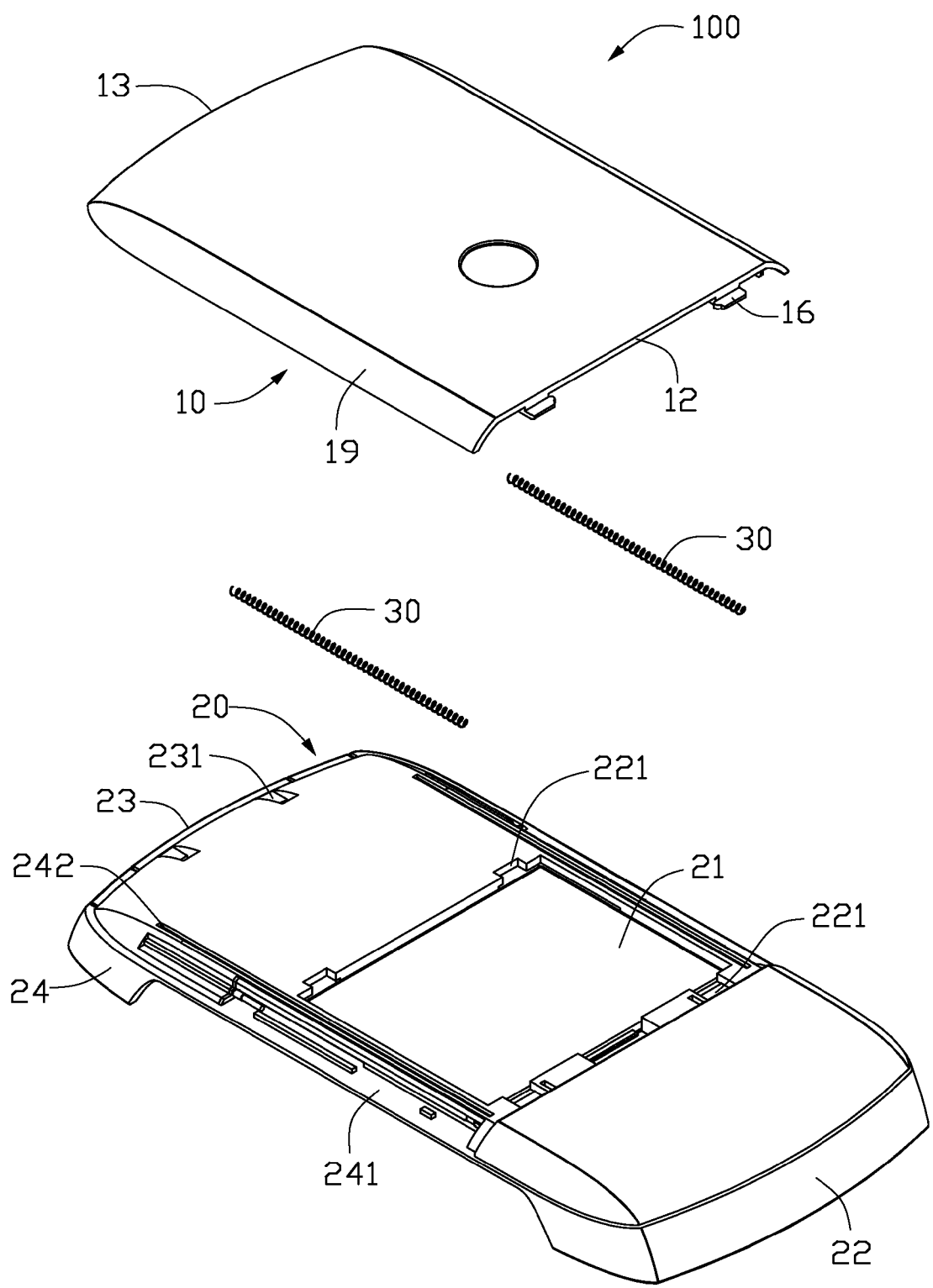
FIG. 1 is an exploded, isometric view of a battery cover latching assembly, in accordance with an exemplary embodiment.
Figure 2:
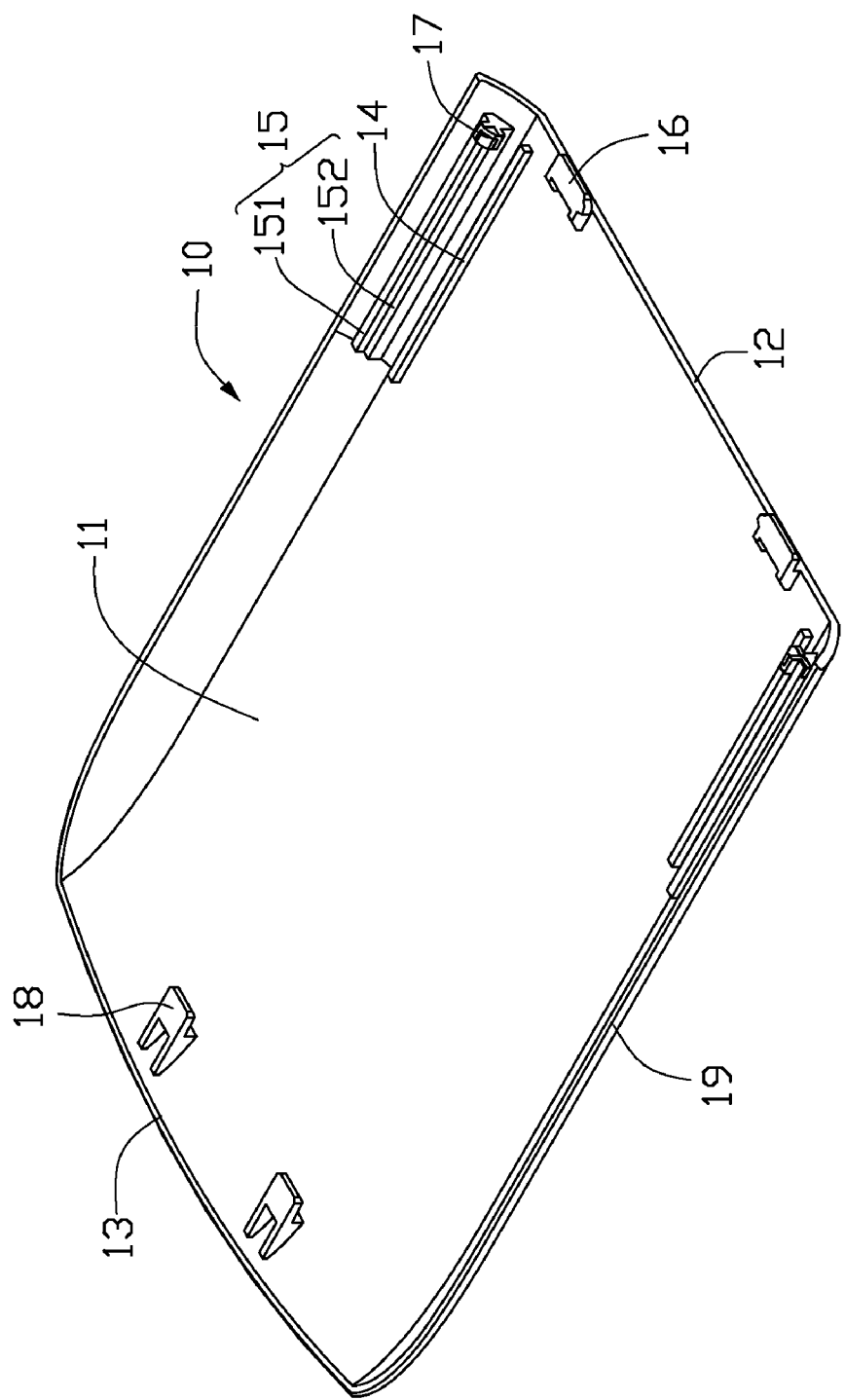
FIG. 2 is an isometric view of the battery cover shown in FIG. 1 viewed from another aspect.
Figure 3:
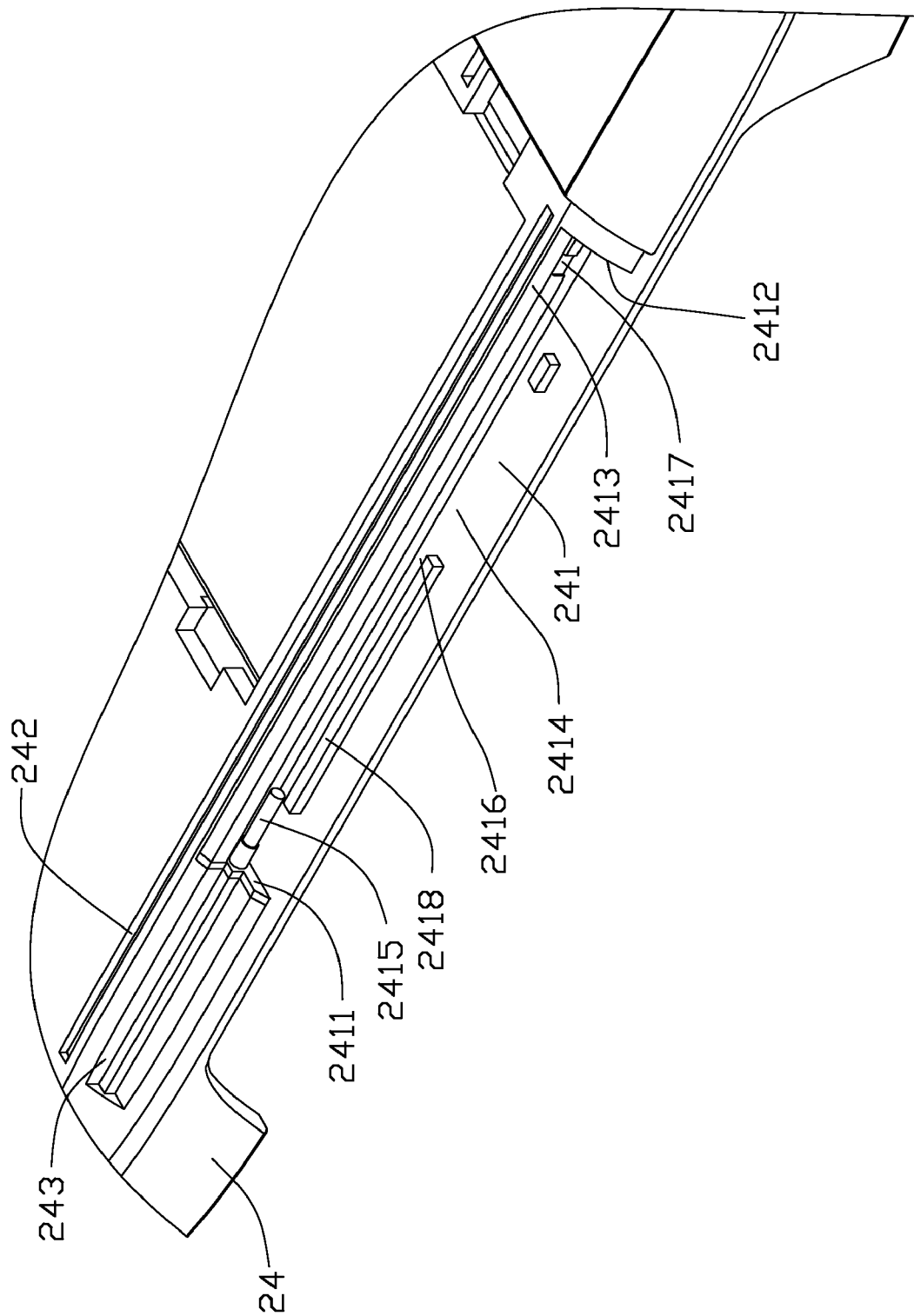
FIG. 3 is an enlarged, isometric view of the housing shown in FIG. 1.

FIGS. 1 through 3 show an exemplary battery cover latching assembly 100 used in portable electronic devices, such as mobile phone terminals, digital cameras, and others. The battery cover latching assembly 100 includes a battery cover 10, a body member 20 and two elastic members 30. The battery cover 10 is slidably mounted to the body member 20. The elastic members 30 offer an elastic force to drive the battery cover 10 to slide relative to the body member 20.

The battery cover 10 is a generally rectangular sheet, and includes an interior surface 11, a first end 12, an opposite second end 13, and two opposite side walls 19. The two opposite side walls 19 both connect with the first and second ends 12, 13, and are longitudinally extended. The battery cover 10 further includes two sliding bars 14, two stopping bars 15, two resisting blocks 17 and two limiting blocks 18. The two sliding bars 14 are disposed on the interior surface 11, adjacent to the first end 12. Each sliding bar 14 is substantially parallel to the side walls 19. Each stopping bar 15 respectively protrudes from one of the side walls 19, adjacent to a corresponding sliding bar 14. The stopping bars 15 each have an L-shaped cross-section. Each stopping bar 15 includes a first stopping bar portion 151 and a second stopping bar portion 152 connecting to the first stopping bar portion 151. The first stopping bar portion 151 and the second stopping bar portion 152 are used to cooperatively receive and secure the elastic member 30 therebetween. The resisting blocks 17 are respectively disposed at one end of a corresponding stopping bar 15, adjacent to the first end 12. The resisting block 17 is configured for being slidably mounted to the body member 20 and used to abut against one end of the elastic member 30. In the exemplary embodiment, the resisting block 17 can be insert-molded with iron to increase its stiffness. The two latching blocks 16 are disposed on the interior surface 11, adjacent to the first end 12. The two limiting blocks 18 are disposed on the interior surface 11, adjacent to the second end 13. The latching blocks 16 and the limiting blocks 18 are used to lock the battery cover 10 to the body member 20.

The body member 20 is a generally rectangular housing of a portable electronic device. The body member 20 defines a battery receiving chamber 21. The battery receiving chamber 21 is enclosed by a top portion 22, a bottom portion 23, and two longitudinal side portions 24. The top portion 22 and the bottom portion 23 respectively define two latching slots 221 adjacent to the battery receiving chamber 21 for corresponding with the latching blocks 16. The bottom portion 23 further defines two limiting grooves 231 for corresponding with the limiting blocks 18. Each side portion 24 defines a longitudinal sliding slot 242 adjacent to the battery receiving chamber 21 corresponding to the sliding bar 14. Each side portion 24 further defines a longitudinal mounting slot 241, thereby forming a first slot wall 2411, a second slot wall 2412, a third slot wall 2413 and a fourth slot wall 2414 surrounding the mounting slot 241. The first slot wall 2411 is adjacent to the bottom portion 23. The second slot wall 2412 is opposed to the first slot wall 2411 and adjacent to the top portion 22. The third slot wall 2413 is adjacent to the battery receiving chamber 21 and longitudinally extended. The fourth slot wall 2414 is disposed opposite to the third slot wall 2413. Each first slot wall 2411 includes a column 2415 longitudinally protruding therefrom and extending into the mounting slot 241. Each elastic member 30 aligns and engages with a corresponding column 2415. The third slot wall 2413 defines a longitudinal guiding slot 2416 therein. The guiding slot 2416 communicates with the mounting slot 241. The resisting block 17 is slidably received in the guiding slot 2416. The third slot wall 2413 further defines an opening 2417 communicating with the guiding slot 2416 adjacent to the second slot wall 2412. Thus, the resisting block 17 can be easily inserted into the guiding slot 2416 via the opening 2417. Several poles 2418 longitudinally protrude from the fourth slot wall 2414, facing the guiding slot 2416. The poles 2418 together with the stopping bar 15 of the battery cover 10 keep the resisting block 17 sliding in the guiding slot 2416. Each side portion 24 further defines a receiving space 243 between the bottom portion 23 and the sliding slot 242. The stopping bar 15 can slide into or out of the receiving space 243 while the battery cover 10 is sliding relative to the body member 20.

The elastic member 30 is a coil spring, with one end aligning with and coiling around the column 2415, the other end resisting against the resisting block 17. Each elastic member 30 is received and retained in one of the guiding slots 2416 by the pole 2418 and the stopping bar 15 of the guiding slot 2416, providing an elastic force to drive the battery cover 10 to slide towards the top portion 22.

Figure 4:
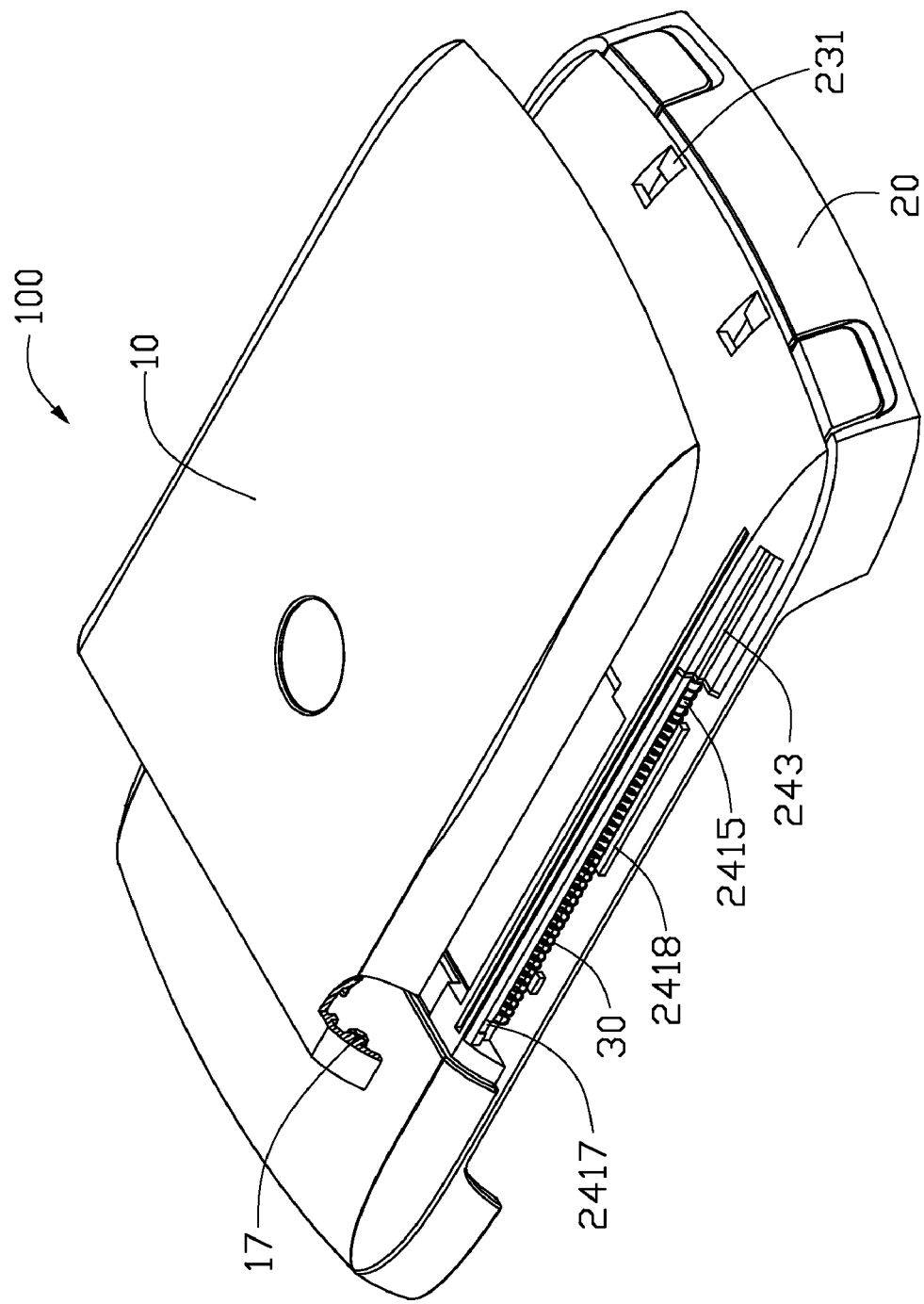
FIG. 4 is a partially assembled view of the battery cover latching assembly shown in FIG. 1.
Figure 5:
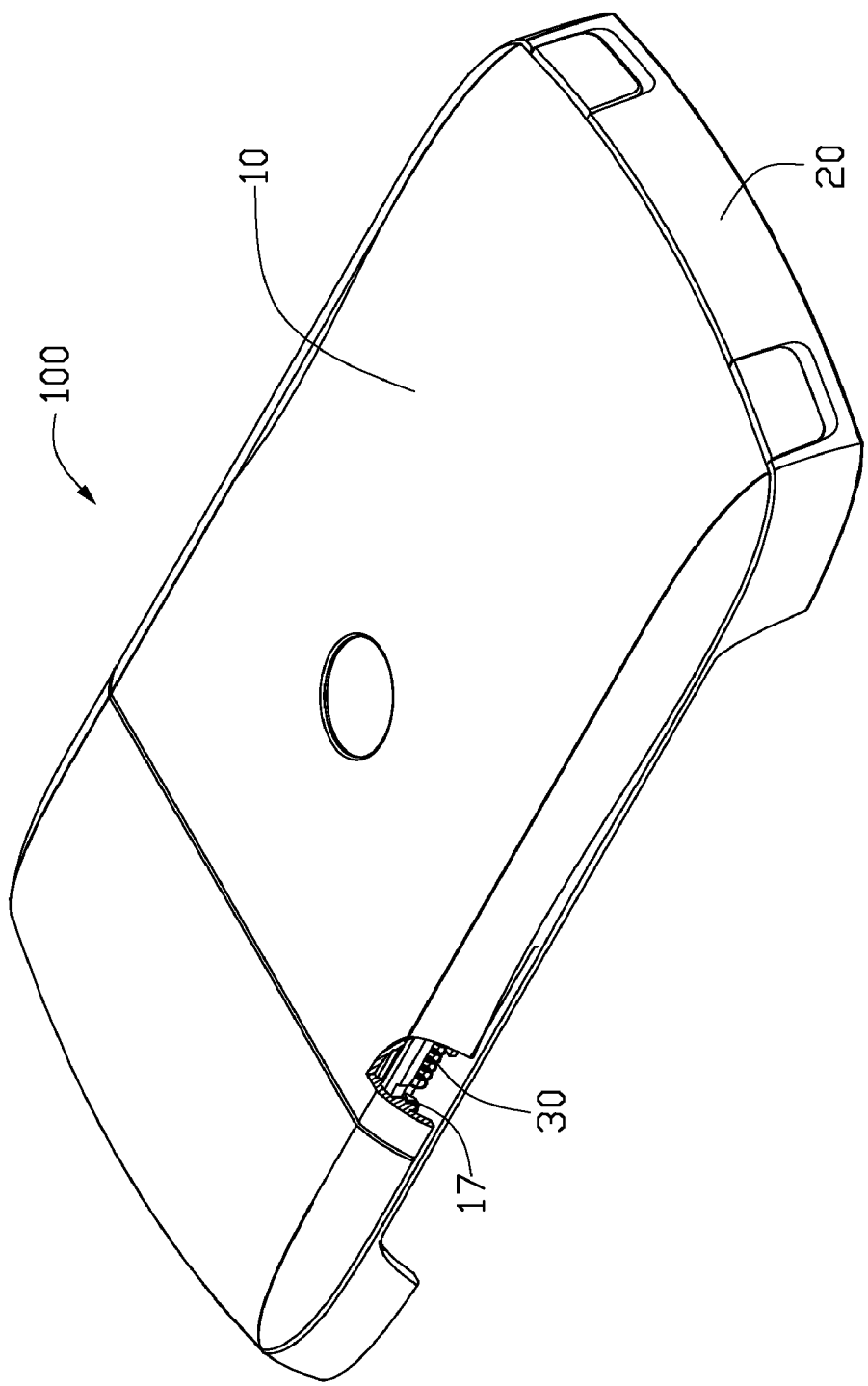
FIG. 5 is an assembled view of the battery cover latching assembly shown in FIG. 1 in a closed position.

Referring to FIGS. 4 and 5, in assembly, the elastic members 30 each are aligned and coiled around the column 2415. The resisting blocks 17 of the battery cover 10 each are aligned with the corresponding opening 2417. Then the battery cover 10 is compressed towards the body member 20 and the resisting blocks 17 are inserted into the guiding slots 2416, resisting against the elastic members 30. At this time, each sliding bar 14 is slidably received in its corresponding sliding slot. 242. Thus, the battery cover latching assembly 100 has been assembled.

Figure 6:
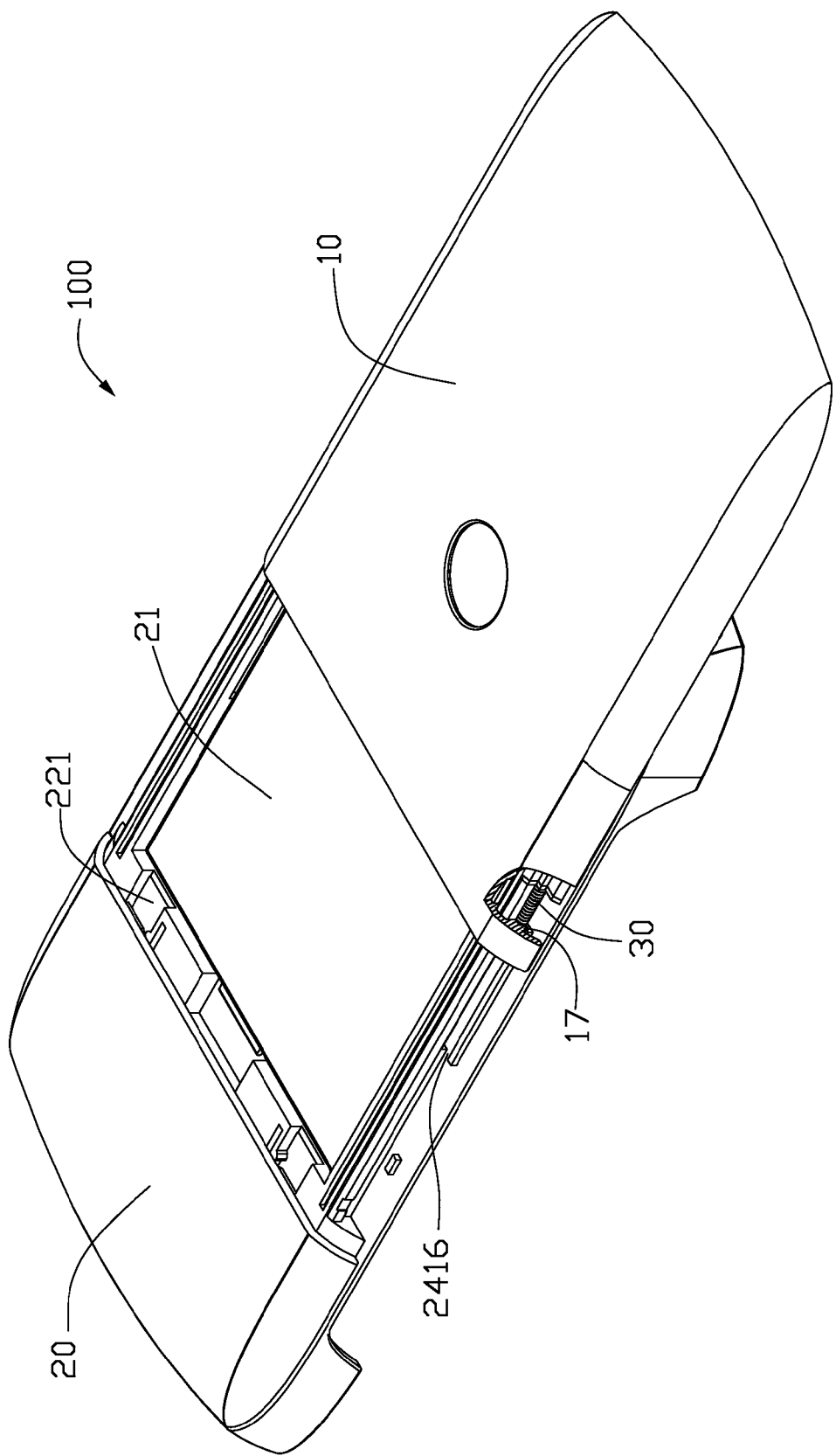
FIG. 6 is an assembled view of the battery cover latching assembly in an opened position shown in FIG. 5.

Referring to FIG. 6, to close the battery cover 10, the battery cover 10 is pushed towards the top portion 22 along the sliding slot 242 until the first latching blocks 16 are released from the latching slots 221 of the bottom portion 23. At this time, the battery cover 10 is biased by the elastic member 30 towards the top portion 22 until the first latching blocks 16 latch into the latching slots 221 of the top portion 22 and the limiting blocks 18 engages with the limiting grooves 231.

To open the battery cover 10, the battery cover 10 is pushed towards the bottom portion 22 until the first latching blocks 16 are released from the latching slots 221 of the top portion 22 and the limiting blocks 18 slides out of the limiting grooves 231. At this time, the battery cover 10 is further pushed against the elastic member 30 towards the bottom portion 22 until the first latching blocks 16 latches into the latching slots 221 of the bottom portion 23. Then, users can easily remove the battery from the battery receiving chamber 21 with the battery cover 10 linked to the body member 20. Thus it is very convenient for users to replace batteries and the battery cover 10 can easily be located.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching assembly comprising:
a body member defining a receiving space, a mounting slot and a guiding slot, the guiding slot communicating with the mounting slot, a cantilever column integrally formed in the mounting slot;
a battery cover slidably mounted to the body member, the battery cover including a stopping bar, a resisting block extending from one end of the stopping bar, the stopping bar slidably received in the receiving space and the mounting slot, the resisting block slidably received in the guiding slot; and
an elastic member received and retained in the guiding slot, one end of the elastic member placed around the cantilever column, and the other end of the elastic member abutting against the resisting block.

2. The battery cover latching assembly as claimed in claim 1, wherein the body member defines a battery receiving space, the battery receiving space enclosed by a top portion, a bottom portion, and two side portions of the body member.

3. The battery cover latching assembly as claimed in claim 2, wherein each side portion defines the mounting slot, forming a first slot wall, a second slot wall, a third slot wall and a fourth slot wall, the first slot wall adjacent to the bottom portion, the second slot wall adjacent to the top portion, the third slot wall adjacent to the battery receiving space, the fourth slot wall opposite to the third slot wall, the guiding slot defined on the third slot wall.

4. The battery cover latching assembly as claimed in claim 3, wherein the cantilever column protrudes from one first slot wall, the elastic member aligns and engages with the cantilever column.

5. The battery cover latching assembly as claimed in claim 3, wherein the third slot wall further defines an opening communicating with the guiding slot adjacent to the second slot wall so that the resisting block can be inserted into the guiding slot through the opening.

6. The battery cover latching assembly as claimed in claim 5, wherein each side portion further defines the receiving space between the bottom portion and the guiding slot; the stopping bar can slide into or out of the receiving space as the battery cover is slid relative to the body member.

7. The battery cover latching assembly as claimed in claim 2, wherein two opposite sliding bars are disposed on the battery cover, each side portion defines a corresponding sliding slot, the sliding slots are parallel to the mounting slot and the receiving space, the sliding bar is slidably received in the sliding slot.

8. The battery cover latching assembly as claimed in claim 1, wherein a plurality of poles are longitudinally formed in the mounting slot and facing the guiding slot, the poles are made of spaced rectangular blocks, the elastic member is received and retained in the guiding slot by the poles and the stopping bar.

9. A battery cover latching assembly comprising:
a body member defining a longitudinal sliding slot and a longitudinal mounting slot at each of two sides thereof, a receiving space defined at one end of each mounting slot, a guiding slot defined in each mounting slot and communicating with the mounting slot, a cantilever column integrally formed in the mounting slot, a plurality of poles longitudinally formed in each mounting slot and facing the guiding slot;
a battery cover slidably mounted to the body member, the battery cover including two stopping bars, a resisting block extending from one end of each stopping bar, the resisting blocks slidably received in the guiding slots; and
two elastic members received and retained in the guiding slots by the poles and the stopping bars, the elastic members abutting against the resisting blocks.

10. The battery cover latching assembly as claimed in claim 9, wherein each receiving space is aligned with one of the mounting slot, the sliding slots are parallel to the mounting slots and the receiving spaces.

* * * * *